Figure 1:
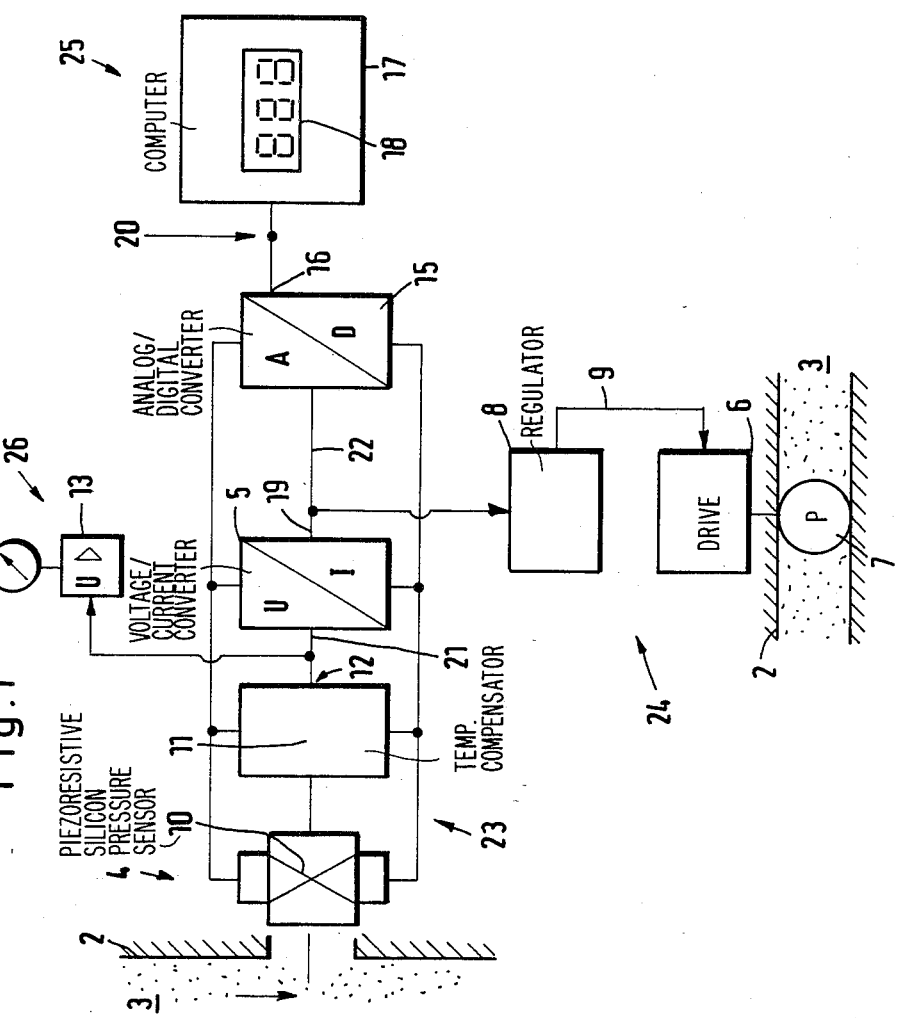

United States Patent [19]

Christlieb et al.

[11] Patent Number: 4,595,342
[45] Date of Patent: Jun. 17, 1986

[54] DEVICE FOR THE CONTROL OF A FLUID PRESSURE OF A TURBOMACHINE ENGINE AND SUPPORT FOR A PRESSURE PICK-OFF

[76] Inventors: Jan Christlieb, Waldweg 34, DE-2171 Todendorf; Karl Müller, Mozartweg 3, DE-2351 Trappenkamp, both of Fed. Rep. of Germany

[21] Appl. No.: 577,627
[22] PCT Filed: May 25, 1983
[86] PCT No.: PCT/DE83/00096
§ 371 Date: Jan. 27, 1984
§ 102(e) Date: Jan. 27, 1984
[87] PCT Pub. No.: WO83/04286
PCT Pub. Date: Dec. 8, 1983

[30] Foreign Application Priority Data

May 29, 1982 [DE] Fed. Rep. of Germany ....... 3220467
May 29, 1982 [DE] Fed. Rep. of Germany ....... 3220466
Sep. 29, 1982 [DE] Fed. Rep. of Germany ....... 3235947

[51] Int. Cl.⁴ ............................................. F04B 49/06
[52] U.S. Cl. ........................................ 417/45; 73/727; 364/510; 417/43; 417/63
[58] Field of Search ................... 364/510; 73/708, 721, 73/727; 417/44, 45, 63, 53, 43

[56] References Cited

U.S. PATENT DOCUMENTS

| | | |
|---|---|---|
| 3,187,510 | 7/1965 | Bunnelle . |
| 3,206,980 | 9/1965 | Nelson .............................. 73/727 X |
| 3,646,815 | 3/1972 | Martin et al. ......................... 73/727 |
| 4,063,824 | 12/1977 | Baker et al. ............................ 417/43 |
| 4,221,134 | 9/1980 | Ekstrom ................................ 73/721 |
| 4,259,620 | 3/1981 | Oates .............................. 363/41 X |
| 4,320,664 | 3/1982 | Rehn . |

FOREIGN PATENT DOCUMENTS

| | | |
|---|---|---|
| 2241883 | 3/1974 | Fed. Rep. of Germany . |
| 2424839 | 12/1975 | Fed. Rep. of Germany . |
| 2607285 | 9/1976 | Fed. Rep. of Germany . |
| 2544518 | 4/1977 | Fed. Rep. of Germany . |
| 2934076 | 3/1980 | Fed. Rep. of Germany . |
| 2946049 | 5/1981 | Fed. Rep. of Germany . |
| 1087783 | 2/1955 | France . |
| 3293963 | 1/1979 | France . |

Primary Examiner—Edward K. Look
Attorney, Agent, or Firm—Andrus, Sceales, Starke & Sawall

[57] ABSTRACT

An arrangement for controlling the pressure of a fluid being pumped by a pump driven by a drive means. The pump pressure is measured by a pressure sensor and transformed into an electrical signal which acts on a regulator for the drive means.

5 Claims, 9 Drawing Figures

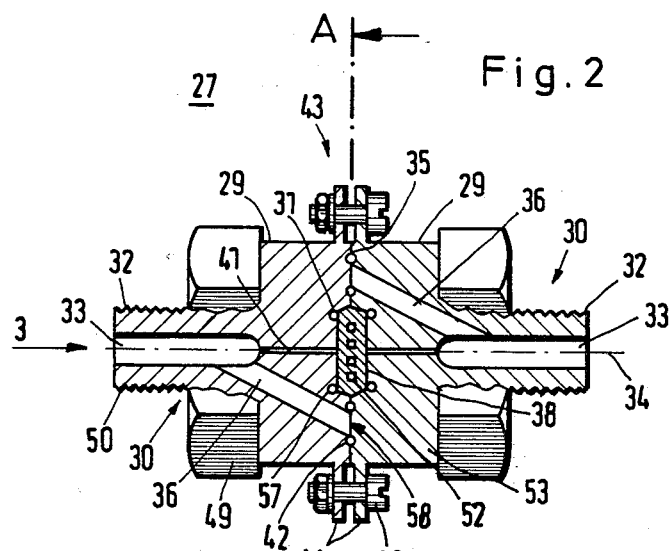
Fig. 2
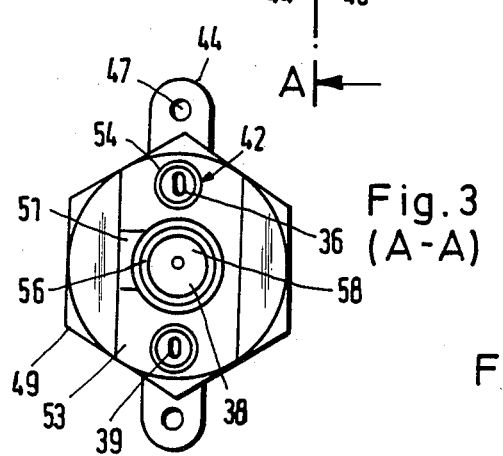
Fig. 3 (A-A)
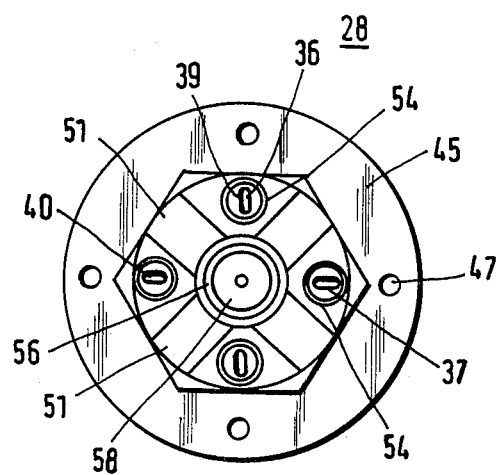
Fig. 4

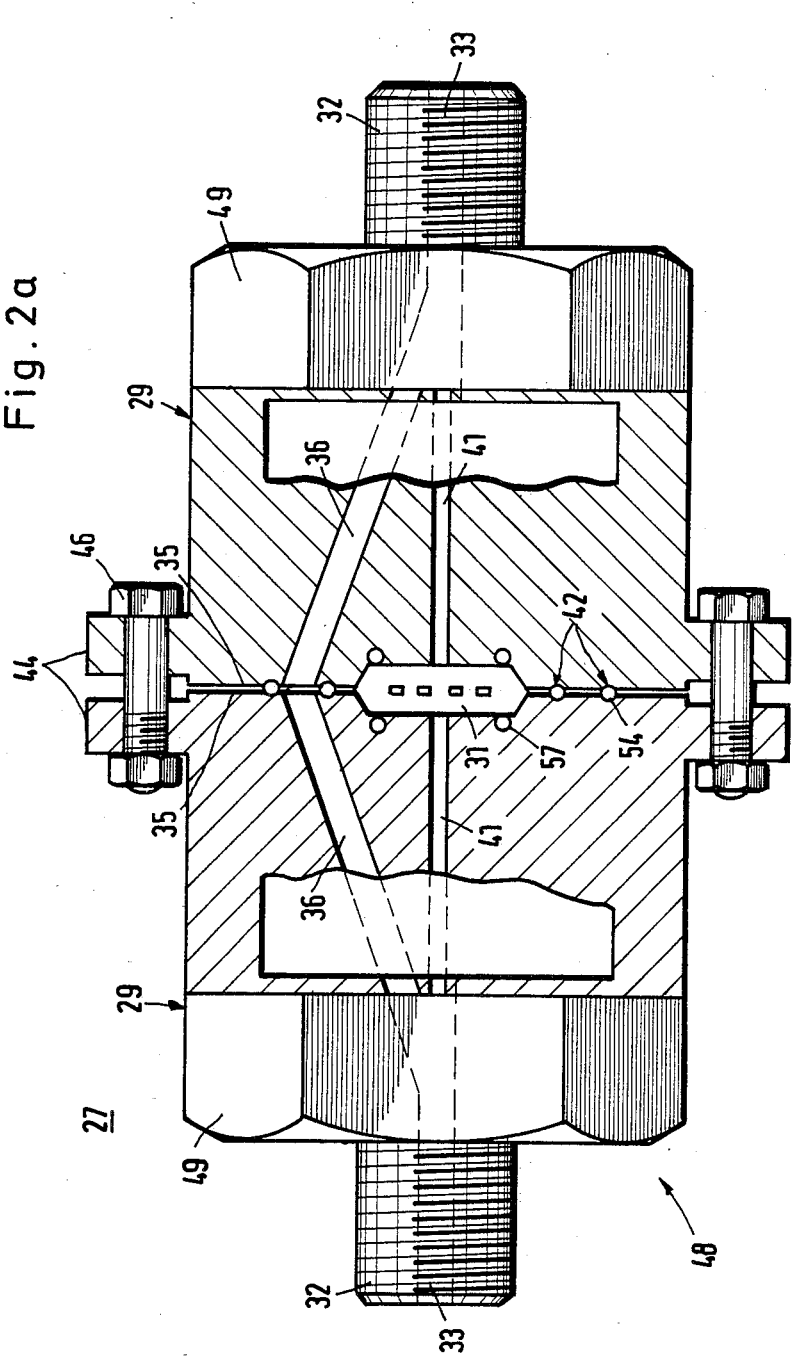

DEVICE FOR THE CONTROL OF A FLUID PRESSURE OF A TURBOMACHINE ENGINE AND SUPPORT FOR A PRESSURE PICK-OFF

The invention relates to to an arrangement for the control of a fluid pressure of a drive motor or engine of a turbomachine or fluid kinetic machine, particularly a pump, as well as a support for an in particular electronic pressure pick-off subject to the action of a gaseous or liquid fluid. It is known to control e.g. the electrical drive motors of pumps, as a function of the test or measured values of mechanical pick-offs. However, these suffer from the disadvantage that the measuring accuracy decreases over a period of time, due to the ageing of mechanically stressed components. In addition, such mechanical pressure pick-offs only permit a limited test value resolution, whilst they are expensive due to their constructionally-caused complicated manufacture. In order to eliminate these disadvantages, electronic pressure pick-offs have already been proposed. In the case of the differential pressure measurements, it must always be borne in mind that the pressure sensors can only be subject to the action of certain maximum differential pressures. In order to be able to take account of the use ranges which occur, it is therefore necessary to store pressure sensors with different output or capacitor levels, which is disadvantageous and costly.

The object of the invention is to provide a method and an arrangement for performing a method which, whilst using a per se known electronic pressure sensor with an e.g. piezoresistive silicon crystal, permits a simple and inexpensive control of the engine of a turbomachine, such as in particular a pump, as a function of the pressure or differential pressure of the fluid to be delivered by said turbomachine. In addition, a device is to be provided for the pressure sensor, by means of which it is made possible to use electronic pressure pick-offs for differential pressure measurements diverging from their design range.

According to the invention, this object is achieved in that the pressure or differential pressure of the fluid delivered by the turbomachine is measured by an electronic pressure sensor, whose transducer is temperature-compensated, then the output signal of the pressure sensor is converted into a current or voltage and this current or voltage value acts on a regulator or regulating unit used for controlling the engine.

In a special development of the invention, the arrangement for achieving the object is constructed in such a way that an electronic pressure pick-off in operative connection with the fluid to be measured is connected on the measured value output side with a voltage/current converter, whose output is connected to a regulator or regulating unit in operative connection with the turbomachine engine. Preferably, the electronic pressure pick-off is constructed as a piezoresistive silicon pressure sensor, whose silicon bridge is connected to a temperature compensator.

The arrangement permits an analog test value reception and processing in the regulator or regulating unit, whilst simultaneously the possibility exists of representing the test values in an analog display and connecting the transducer via an A/D-converter with a computer, by means of which it is possible e.g. to optimize the operation of the fluid-containing system.

According to a further development of the invention, two support parts are provided for each pressure sensor which, whilst receiving a pressure sensor, can be interconnected and can be brought into operative connection with the fluid to be measured by means of connecting pieces constructed on the end portions of the support parts in such a way that by rotating the support parts about their common central axis by a predetermined angle, it is possible to adjust the maximum measurable pressure difference on the pressure sensor.

Further features of the invention are described in the subclaims.

Embodiments of the invention are described hereinafter relative to the drawings, wherein is shown:

FIG. 1 an arrangement according to the invention for performing the fluid pressure-dependent control represented in the manner of a circuit diagram.

FIGS. 2 and 2a, supports constructed according to the invention in side view and in part sectional form.

FIG. 3 a transverse view of the support according to FIG. 1 in section A—A.

FIG. 4 a further construction of the support according to the invention in a transverse view in section as in FIG. 2.

Figure 5A:
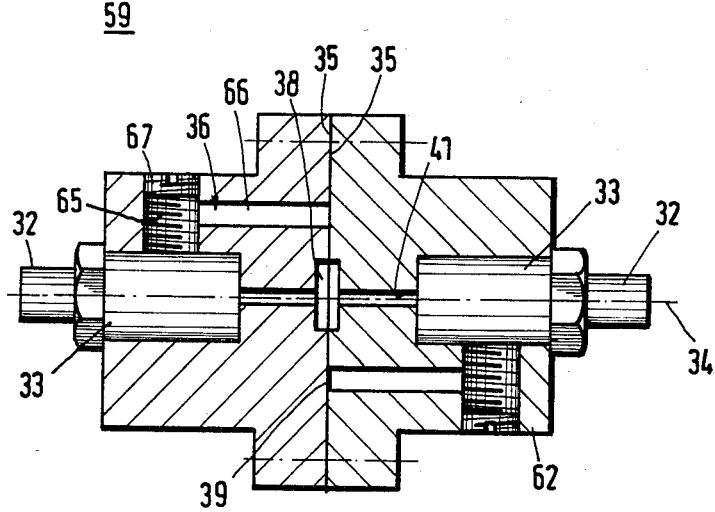
Figure 5B:
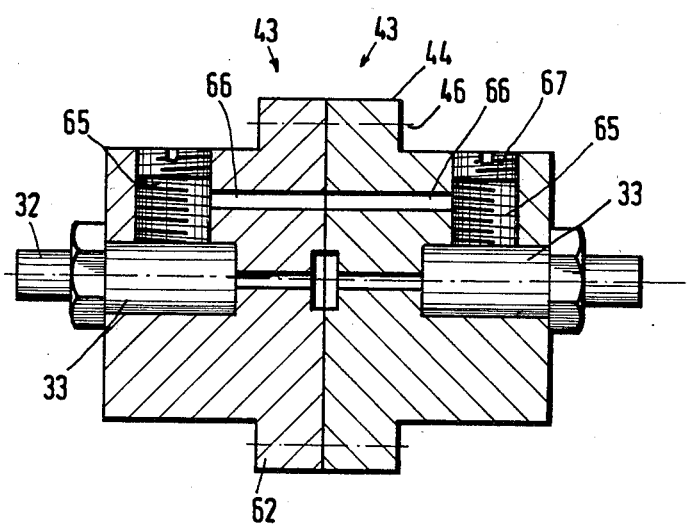

FIGS. 5a and 5b, a further construction of the support in side view.

Figure 6A:
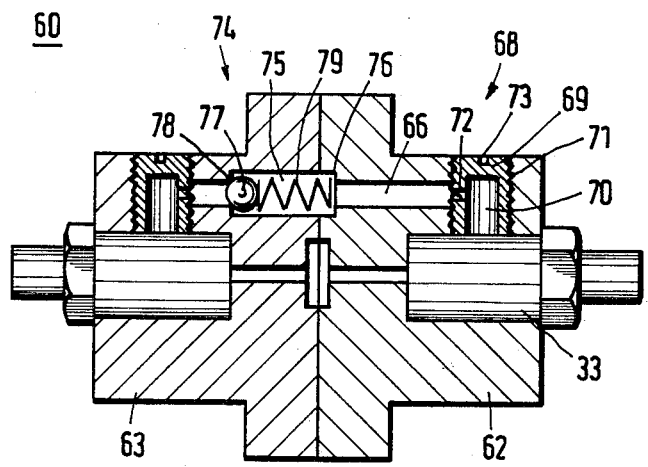
Figure 6B:
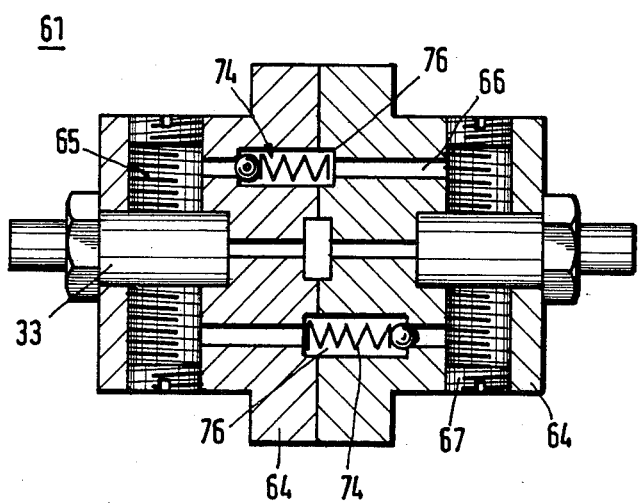

FIGS. 6a and 6b, a side view of a support with safety valves.

Arrangement 1 is a transducer 23 and a regulating device 24, whilst it is additionally possible to provide a test value processing device 25 and a display unit 26.

The transducer 23 has an electronic pressure pick-off 4 and a temperature compensator 11. The pressure pick-off 4 is constructed as a piezoresistive silicon pressure sensor, whose silicon bridge 10 is in operative connection with the pipe or duct 2, through which flows the fluid 3 to be measured. In order to prevent deterioration to the silicon bridge 10, it is coated with a not shown insulating layer. Silicon bridge 10 is connected to the temperature compensator 11, by means of which the measured pressure values of fluid 3 are compensated with respect to temperature fluctuations thereof. A voltage/current converter 5 is connected by a control line 21 to output 12 of temperature compensator 11. This converter makes it possible to convert the output signal of pressure pick-off 4 into a current or voltage value, which is applied by means of output 19 of the voltage/current converter 5 to a regulator or regulating unit 8. The output value of the voltage/current converter 5 can e.g. be 0 to 20 mA or 0 to 10 V. The regulator or regulating unit 8 is connected by means of a control line 9 with drive motor or engine 6 of the turbomachine 7. If a regulating unit 8 is used, it can e.g. be constructed as a frequency inverter.

It is appropriate for the purpose of monitoring the operation of arrangement 1 to connect the same with a display unit 26 and/or a test value processing unit 25. Display unit 26 comprises an analog display 14, which is connected by means of a test voltage amplifier 13 to output 12 of temperature compensator 11.

The test value processing device 25 comprises an electronic computer 17, which can have a digital display 18. By means of junction 20, electronic computer 17 is connected to the output 16 of an A/D-converter 15, which is connected by means of a control line 22 to the voltage/current converter 5. The electronic computer 17 can be constructed as a processor circuit or as a microprocessor. The construction of the electronic computer 17 as a microcomputer can be advantageous, if the arrangement 1 is part of an intermeshed system of different pressure pick-offs 4 and associated drive motors 6, which must be matched to one another in optimum manner in operation.

Arrangement 1 permits a simple and inexpensive use of electronic pressure pick-offs 4 for controlling turbomachine 7, the measuring accuracy not being impaired over a period of time. The combination of the individual elements must particularly make it possible to integrate the transducer 23 and the regulating unit 24 functionally into a larger control system. It is also possible to construct the pressure pick-off 4 as a differential pressure pick-off.

Support 27 shown in FIG. 2 comprises two support parts 29, which in each case have a cylindrical base 53. A pin-like connecting piece 32, coaxial to the central axis 34 is constructed on each of the outer end portions 30 of support parts 29. A hexagon 49 with flats 48 for engaging a tool or the like is provided on end portion 30 of each support part 29. In the facing faces 35, 35 of support parts 29, 29 is centrally provided a recess 38, 38 for receiving a pressure sensor 31. Each recess 38 is connected by means of a channel-like opening 41 to connecting piece 32. In the connecting pieces 32, as well as in the end portions 30 of base 53 of each support part 29 is provided a channel-like recess 33 connected to the opening 41 and whose cross-section is larger than that of opening 41. Between recess 33 and face 35 is provided a channel-like opening 36, whose aperture 39 in the plane of face 35 is spaced from recess 38. The cross-section of opening 36 is larger than that of opening 41. In the vicinity of aperture 39 are provided guide members 42 on faces 35, by means of which the support parts 29 on operatively engaging the guide members 42 are non-rotatable in the plane of faces 35.

By means of guide members 42, support parts 29 are so non-rotatably engageable in the plane of faces 35, that either one opening 36 of one support part 29 is in hydraulic or pneumatic operative connection with the equally large opening 36 of the other support part 29, or aperture 39 of openings 36 of support parts 29, 29 are blocked by flat portions 58 of faces 35, 35.

Openings 36 act as a bypass relative to openings 41. If aperture 39 of openings 36 is blocked by the corresponding reciprocal positioning of support parts 29, 29, by means of openings 41 pressure sensor 30 is subject to the full differential pressure acting on connecting pieces 32. However, if the openings 36 are not blocked and act as a bypass, openings 41 act as a throttle, so that most of the pressure balance takes place by means of openings 36. Thus, as a function of the cross-sectional ratio of the faces of openings 36, 41, pressure sensor 31 can be provided for measuring differential pressures for which it is not in fact designed.

A flange-like web 44 is constructed peripherally on the engageable end portions 43, 43 of support parts 29, 29. Each web 44 contains an opening 47, through which can be placed screws. These screws are used for forming a screw connection 47, by means of which the engageable support parts 29 can be interconnected. Adhesive joints can be provided in place of the screw connections 46, or in addition to the latter. After producing the connection between the two support parts 29, it is also possible to provide webs 44 with a common coating of casting resin or the like. This ensures that support 27 can no longer be disassembled in non-destructive manner.

The face 35 of each support part 29 also contains a recess 51 extending from the central recess 38 radially up to the outer circumference of base 53. The cavity formed by two recesses 51 is always dimensioned in such a way that in the case of support parts 29 to be interconnected, a plug can be connected with the contacts 52 of pressure sensor 31.

As shown in FIG. 4, it is possible to provide in each support part 29, two openings 36, 37, which have different cross-sections. Also in the case of this support 28, it is possible to associate guide member 42 with each aperture 39, 40 of opening 36, 37. By means of the additional openings 40, it is possible to use a support 28 comprising said support parts 29 for a supplementary differential pressure range compared with support 27. In order to be able to connect contact 52 of pressure sensor 31 in connection with support 28 with a plug, in this case four recesses 51 at right angles to one another are provided in faces 35 of support parts 29. The recesses 51 not required for contact 52 of pressure sensor 31 can, after joining support part 29, be closed by casting resin or the like. The flange-like web 45 of support parts 29 of support 28 is constructed as a circular flange and has four openings 47 for the screws of the screw connections 46, which are not shown in detail.

The pressure of fluid 3 is supplied to pressure sensor 31 by means of connecting pieces 32. An external thread 30 is provided on the outer periphery of the pin-like support parts 32 and onto it can be screwed the connecting lines or fittings. It is also possible to construct the outer faces of connecting pieces 32 in threadless manner with a cylindrical or conical cross-section and in this case the connecting lines are connected by means of not shown clamping fastenings.

FIGS. 5a and 5b show another embodiment of a support 59, which comprises two support parts 62 where once again a bypass is constructed parallel to opening 41. However, this does not comprise openings drilled in oblique-angled manner with respect to central axis 34, as in the case of supports 27, 28, but instead comprises two channel sections 65, 66 which are at right angles to one another. Channel section 65 is constructed as a through-bore between recess 33 and the outer periphery of support part 62. The inner casing of channel section 65 is provided with a thread, so that the outlet side portion of channel section 65 can be closed by means of a plug 67. A further channel section 66 extending up to face 35 is provided at right angles to channel section 65. The construction of the bypass by means of channel section 65, 66 greatly facilitates the manufacture of support 59 compared with supports 27, 28, because the machining accuracy requirements are less severe.

Appropriately, the plug closing channel section 65 is constructed as a throttle member 39. Plug 69 is a threaded part on which is externally formed a control member 73, which can e.g. comprise a slit for a screwdriver or the like. A blind holelike recess 70 is formed in plug 69. In addition, casing 71 has an opening 72 in the vicinity of recess 70 and said opening can be constructed as a nozzle or throttle. If a differential pressure measurement is required by means of the bypass formed by channel sections 65, 66, it is merely necessary to turn plug 69 in channel sections 65 in such a way that openings 72 are associated with channel sections 66. As the geometrical configuration of opening 72 is accurately defined, a precise differential pressure measurement is possible by means of the bypass. If there is to be no differential pressure measurement by means of the bypass, it is merely necessary to turn at least one plug 69 by 90°, so that opening 72 does not provide a flow connection between the recesses 33 of support parts 62.

Due to their mechanical strength, only limited pressure can be applied to electronic pressure sensors 31. To ensure that in the case of operational faults, there are no differential pressures which could damage the pressure sensors, it is possible to provide pressure relief valves 74. Such a support 60, 61 is shown in FIGS. 6 and 6b.

In the case of support 60, the portion of channel section 66 facing face 35 in a support part 63 is extended to form a chamber 75, which is used for receiving the pressure relief valve 74. The transition between chamber 75 and channel section 66 is constructed as a valve seat, onto which a ball 78 can be pressed by means of a spring 79. Spring 79 is mounted in a recess 76 of the other support part 62, which facilitates the fitting of support 60 with pressure relief valve 74. However, it is also possible to make spring 79 bear directly on face 35 of support part 62. If the differential pressure exceeds a given size, the pressure relief valve 74 opens and there is a pressure balance between recesses 33 of support parts 63, 62 by means of the bypass.

If changing differential pressures are to be expected, support 61 is used, which has two pressure relief valves 74. Support 61 comprises two support parts 64 having in each case two parallel channel sections 66. Two channel sections 65 are constructed on either side of recesses 33. One channel section 66 contains a chamber 75 for pressure relief valve 74, whilst the other channel section 66 contains a recess 76 as a valve bearing for the other pressure relief valve 74.

If the or one of the pressure relief valves 74 operates, the differential pressure acting on pressure sensor 31 seeks to reach a zero value as a result of the pressure balance by means of the bypass, to that this fault can be indicated by means of a suitable switching member. This fault indicator is to be connected to the outputs of pressure sensor 31.

We claim:

1. An arrangement for controlling the pressure of a fluid being pumped by a pump driven by a drive means, said arrangement comprising:
   (a) a piezoresistive silicon pressure sensing means (4) responsive to the fluid, said pressure sensing means having a piezoresistive silicon pressure sensor (31) mounted in a support (27, 28, 59, 60, 61), said support comprising two interconnected support parts (29, 29, 62, 62, 63, 63, 64, 64) which can be rotated about their common central axis (34) by a predetermined angle for setting the maximum measurable pressure difference on said pressure sensor (31), said support parts having in their interconnected faces (35, 35) central recesses (38) for receiving said pressure sensor (31), said recesses being connected by means of channel-like openings (41, 41) and channels (33) to the exterior of said support parts (29, 29, 62, 62, 63, 63, 64, 64), at least one channel-like passage (36, 37) extending between said channel (33) and face (35) of each support part (29, 29, 62, 62, 63, 63, 64, 64), said channel-like passage (36, 37) having a larger cross section than that of said opening (41), the aperture (39, 40) of said channel-like opening (36, 37) in said faces (35) being spaced from recesses (38);
   (b) a temperature compensator (11) connected to said pressure sensing means;
   (c) a voltage/current converter (5) operable by the temperature-compensated output signal of said pressure sensing means;
   (d) regulating means (8) coupled to the output of said voltage/current converter (5) and couplable to the drive means (6) of the pump (7) for controlling the drive means responsive to said output signal;
   (e) an A/D converter (15) coupled to the output of said voltage/current converter;
   (f) an electronic computer (17) coupled to said A/D converter (15) for processing and displaying test values;
   (g) and analog display means (14) coupled to said temperature compensator (11).

2. Arrangement according to claim 1 wherein the piezoresistive silicon pressure sensing means (4) has a silicon bridge (10) connected to said temperature compensator (11).

3. Arrangement according to claim 1, characterized in that the pressure sensor silicon bridge (10) is coated with an insulating coating.

4. Arrangement according to claim 1, characterized in that the electronic computer (17) has a digital display (18).

5. Arrangement according to claim 1, characterized in that the regulating unit (8) is constructed as an inverter.

* * * * *